US010040002B2

(12) United States Patent
Bibet et al.

(10) Patent No.: US 10,040,002 B2
(45) Date of Patent: Aug. 7, 2018

(54) MULTIPHASE PUMPING DEVICE

(71) Applicant: TOTAL SA, Courbevoie (FR)

(72) Inventors: Pierre-Jean Bibet, Pau (FR); Jean-Luc Le Rodallec, Pau (FR); Olivier Saincry, Pau (FR)

(73) Assignee: TOTAL SA, Courbevoie (FR)

( * ) Notice: Subject to any disclaimer, the term of this patent is extended or adjusted under 35 U.S.C. 154(b) by 111 days.

(21) Appl. No.: 14/907,562

(22) PCT Filed: Jul. 15, 2014

(86) PCT No.: PCT/FR2014/051815
§ 371 (c)(1),
(2) Date: Jan. 25, 2016

(87) PCT Pub. No.: WO2015/011369
PCT Pub. Date: Jan. 29, 2015

(65) Prior Publication Data
US 2016/0184739 A1 Jun. 30, 2016

(30) Foreign Application Priority Data
Jul. 24, 2013 (FR) ...................... 13 57306

(51) Int. Cl.
B01D 19/00 (2006.01)
E21B 43/12 (2006.01)
(Continued)

(52) U.S. Cl.
CPC ..... *B01D 19/0063* (2013.01); *B01D 19/0068* (2013.01); *E21B 43/121* (2013.01); *F04B 13/02* (2013.01); *F04B 47/06* (2013.01); *F04C 2/16* (2013.01); *F04C 13/001* (2013.01); *F04C 18/16* (2013.01); *F04D 31/00* (2013.01); *F17D 1/005* (2013.01); *F04D 1/04* (2013.01)

(58) Field of Classification Search
CPC ........ E21B 43/00; E21B 43/12–43/129; E21B 21/10–21/18; B01D 19/00;
(Continued)

(56) References Cited
U.S. PATENT DOCUMENTS
5,962,780 A 10/1999 Prouvost
6,234,030 B1 5/2001 Butler
(Continued)

FOREIGN PATENT DOCUMENTS
FR 2 760 526 A1 9/1998
FR 2 936 312 A1 3/2010
GB 2 215 408 A 9/1989

OTHER PUBLICATIONS
International Search Report for PCT/FR2014/051815, dated Sep. 10, 2014, 4 pgs.
(Continued)

Primary Examiner — T. Bennett McKenzie
(74) Attorney, Agent, or Firm — Patterson Thuente Pedersen, P.A.

(57) ABSTRACT

This invention relates to a multiphase pumping device comprising a pump suitable for pumping a pumping fluid, a recycle circuit and at splitter tank. The splitter tank is connected to an area downstream of the pump and is suitable for separating a liquid phase and a gaseous phase using pumping fluid. In addition, the recycle circuit is connected to the splitter tank and is suitable for enabling the flow of the liquid phase from the splitter tank to an area upstream of the pump.

5 Claims, 2 Drawing Sheets

(51) Int. Cl.
*F04B 13/02* (2006.01)
*F04B 47/06* (2006.01)
*F04D 31/00* (2006.01)
*F17D 1/00* (2006.01)
*F04C 2/16* (2006.01)
*F04C 13/00* (2006.01)
*F04C 18/16* (2006.01)
*F04D 1/04* (2006.01)

(58) Field of Classification Search
CPC ............ B01D 19/0063; B01D 19/0068; F04B 13/001; F04B 13/02; F04B 47/06; F04C 2/16; F04C 18/16; F04D 31/00; F04D 1/04; F17D 1/005
USPC .......................................................... 96/156
See application file for complete search history.

(56) References Cited

U.S. PATENT DOCUMENTS

2007/0274842 A1* 11/2007 Campen .................. E21B 43/36
  417/53
2012/0132010 A1   5/2012 Cadalen

OTHER PUBLICATIONS

English translation of International Search Report for PCT/FR2014/051815, dated Sep. 10, 2014, 3 pgs.

* cited by examiner

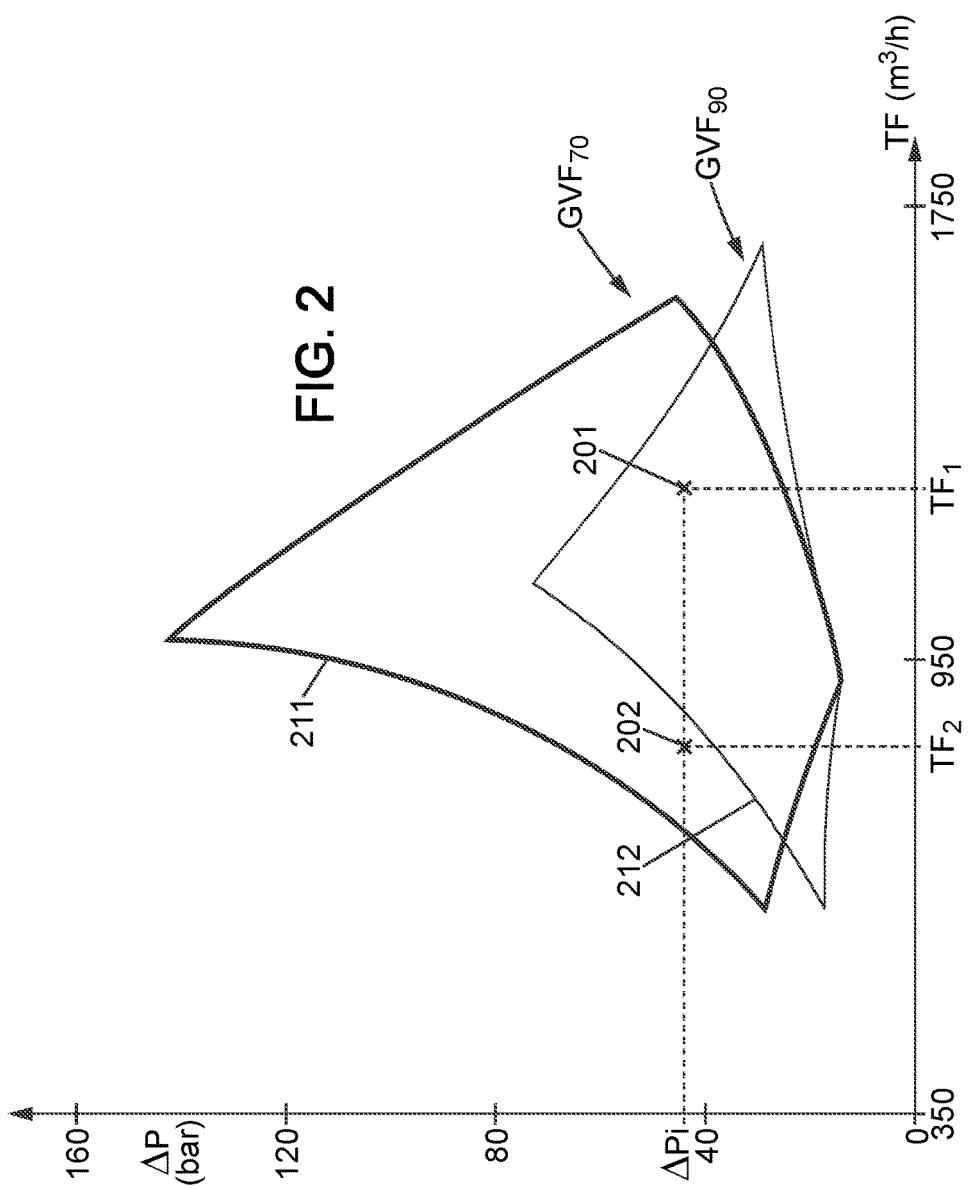

MULTIPHASE PUMPING DEVICE

RELATED APPLICATIONS

The present application is a National Phase entry of PCT Application No. PCT/FR2014/051815, filed Jul. 15, 2014, which claims priority from FR Patent Application No. 13 57306, filed Jul. 24, 2013, said applications being hereby incorporated by reference herein in their entirety.

FIELD OF THE INVENTION

This invention relates to the field of multiphase pumping, in particular in the field of pumping fluids in the framework of underwater oil drilling wells.

BACKGROUND OF THE INVENTION

For architectures of conventional underwater pumping stations, it was for a long time customary to use pumps that are not very powerful (<1 MW) and that have a relatively low pressure differential (i.e. low $\Delta P$, <50 bar). With the advances in technical progress, more powerful pumps must be used (about 2.5 MW), for example in so called recent "Offshore deep-sea drilling" projects such as the Pazflor project and the GirRI project. These pumps can be suitable for generating a pressure differential $\Delta P$ of about 130 bar.

These new pumps can in particular be:
High Boost MPP pumps (for "multiphase pump");
hybrid pumps.

Although the power of these pumps was increased, the pumping devices that accompany these pumps have not changed (i.e. pumping stations outside the pumps).

However, such devices are not free of defects.

Indeed, although these pumping devices satisfied the characteristics of low-power pumps, the operating constraints of high-power pumps impose improving these devices.

This invention improves the situation.

SUMMARY OF THE INVENTION

This invention proposes a device for protecting multiphase pumps in case of an abrupt change in the composition of the pumped fluid.

This invention thus aims for a multiphase pumping device comprising:
a pump suitable for pumping a pumping fluid;
a recycle circuit;
a splitter tank.

Furthermore, the splitter tank is connected to an area downstream of the pump and is suitable for separating a liquid phase and a gaseous phase using said pumping fluid.

The recycle circuit is connected to the splitter tank and is suitable for enabling the flow of the liquid phase from said splitter tank to an area upstream of the pump.

The term "area downstream of the pump" refers to an area connected to the outlet of the pump. As such, the fluid transits through the splitter tank once this fluid has been pumped.

The term "area upstream of the pump" refers to an area connected to the inlet of the pump. As such, the recycle circuit makes it possible to reinject a liquid portion of the fluid pumped upstream of the pump.

Although this reinjection can lower the energy efficiency of the pump, it can enable the pump to be placed in safety by supplying it with a minimum flow rate of liquid. This minimum flow rate makes it possible to prevent deteriorations of the multiphase pump which is not designed to operate without liquid fluid.

The minimum flow rate of a pump can depend on its speed.

In an embodiment, the recycle circuit can comprise at least in series:
a controllable opening valve, and
a quick opening valve.

In addition, the quick opening valve can authorise on order the flow or not of the liquid phase in the recycle circuit.

Finally, the controllable opening valve can be suitable for being pre-opened in order to authorise the partial flow and control the liquid phase in the recycle circuit. The percentage of the opening can be controlled for this controllable opening valve.

The quick opening valve can be, for example, an "on-off" type valve of which the opening is rapid following the release of a mechanical part or of a spring.

The controllable opening valve can be a valve of the "choke-valve" type of which the opening can be adjusted. In the field of deep-sea drilling, these valves open and close hydraulically, and a complete opening and/or closing cycle can take several minutes.

The pre-opening of the controllable opening valve can make it possible to adjust the flow rate within the recycle circuit on the minimum flow rate of the pump for the speed under consideration for this pump. As such, in case of an abrupt change in the composition of the fluid (e.g. clog of gas), it is possible to immediately open a quick opening valve, with the flow rate then being controlled by the pre-opened controllable opening valve.

In a possible embodiment, the device can furthermore comprise a mixer tank located upstream of the pump. The flow of the liquid phase through the recycle circuit can then be carried out towards said mixer device.

Before the reinjecting of the liquid fluid into the pump, a mixer tank can make it possible to reduce the variations in the composition of the pumped fluid. As such, if a clog of gas is pumped, the latter can be mixed with the liquid fluid circulating in the recycle circuit. The fluid transiting in the pump then has a composition of gas and of liquids that is smooth over time.

In an embodiment, the device can furthermore comprise a multiphase flow meter located downstream of the pump. In addition, the flow of the liquid phase from said splitter tank to an area upstream of the pump can then be controlled according to at least one measurement of the fluid by said multiphase flow meter.

As such, the opening of at least one valve located on the recycle circuit (i.e. controlling the circulation in the recycle circuit) is controlled by information coming from the pumped fluid.

The at least one measurement of the fluid by said multiphase flow meter can be a measurement from among a flow volume measurement, and a measurement of the ratio of the gas volume over total volume.

The multiphase flow meter can be located upstream of the splitter tank.

Other characteristics and advantages of the invention shall further appear when reading the following. The latter is purely for the purposes of information and must be read with regards to the annexed drawings wherein:

BRIEF DESCRIPTION OF THE DRAWINGS

FIG. 2 shows an example of an operating diagram of a multiphase pump in an embodiment of the invention.

DETAILED DESCRIPTION OF THE DRAWINGS

Figure 1:
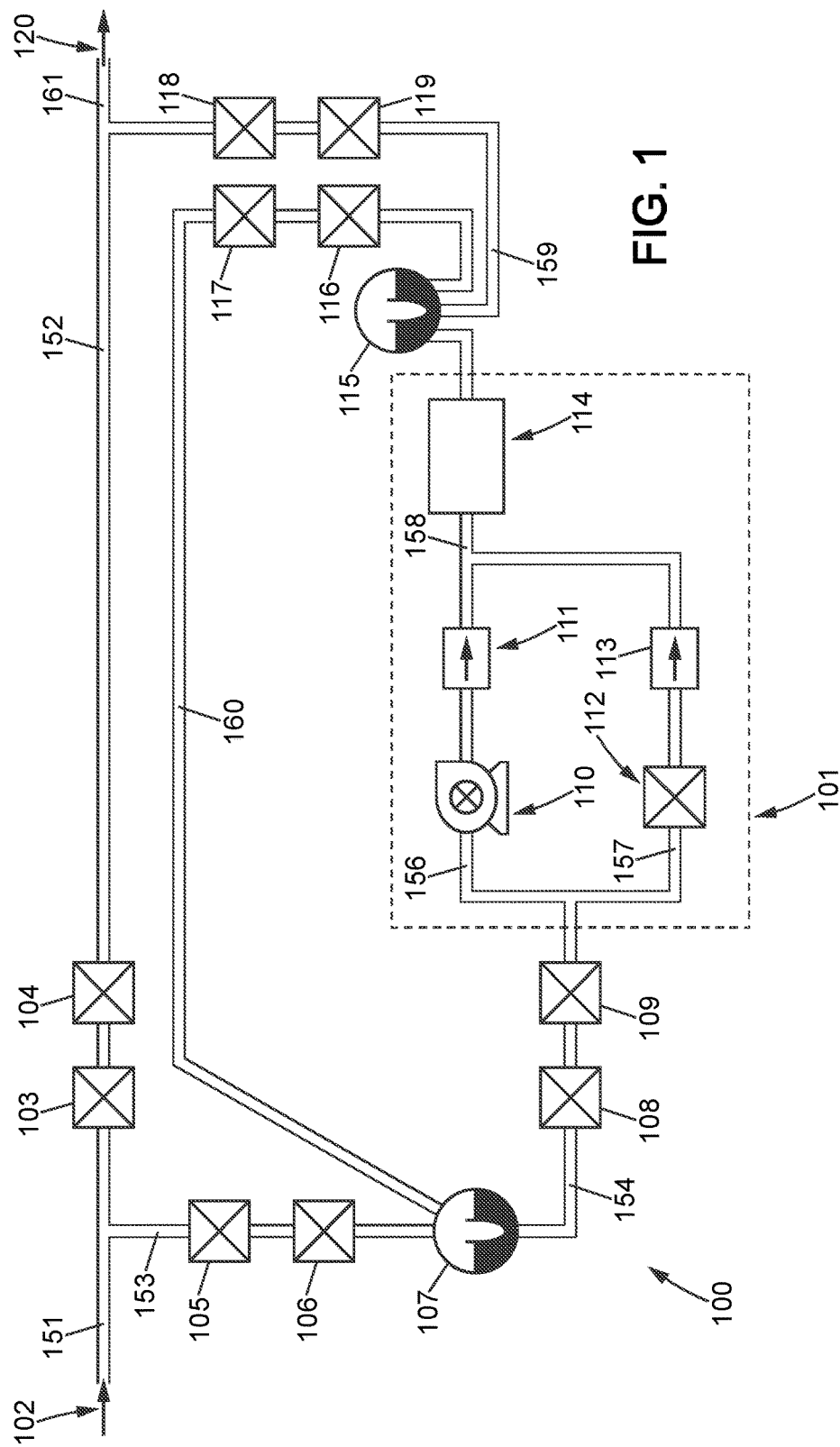
FIG. 1 shows an example of an underwater pumping station in a particular embodiment of the invention.

FIG. 1 shows an example of an underwater pumping station in a particular embodiment of the invention.

This pumping station comprises:

an inlet 102 connected to the production well;

an outlet 120 connected to the production line and which makes it possible to raise the pumped fluid to the surface;

pumping circuits 151 to 161 which make it possible to circulate the pumped fluid;

valves 103 to 106, 108, 109, 112, 116 to 119. These valves can be choke valves, "on-off" valves, or any other type of valves. Some valves can be advantageously valves that open or that close automatically in case of failure of their control system (hydraulic or electric for example) such as for example valves 103 or 104, 116 or 117;

a pump 110;

a mixer tank 107. During the pumping in conditions of a non-constant flow, the pump must handle operating conditions that can vary very abruptly (clog of liquid without gas or clogs of gas). The rapid change in these conditions can cause abrupt variations in the load on the pump, and can cause mechanical problems or failures on the rotor of the latter. A mixer tank makes it possible to mix the liquid and to homogenise it before having it pass through the pump. As such, the mixer tank can make it possible to limit the fluctuation of the torque of the shaft during pumping and therefore the degradations of the pump;

non-return valves 111 and 113;

a multiphase flow meter 114 (or MPFM). A multiphase flow meter is a device used to take measurements on the pumped fluid (mixtures of oil, water and gas produced) during the production process;

a splitter tank 115 makes it possible to separate the liquid, gas and solids in suspension in the liquid (such as sand, etc.). For the purposes of illustration, it is possible to use decanting in order to carry out this separating. As such, due to their respective density, the various phases are separated: the heaviest materials are at the bottom of the tank. According to the tapping height (i.e. height of recovery in the tank), it is possible to recover either the solid matter (i.e. low tapping) or the liquid matter (i.e. tapping at a medium height) or gases (i.e. high tapping). It is also possible to recover a mixture of different phases as the separation of the various phases may not be complete.

The elements 110 to 114 and 156 to 158 constitute a pumping block 101 that can be retrieved from the pumping station. For example, this retrieval makes it possible to raise to the surface the pumping block 101 for the purposes of technical maintenance (e.g. repairs).

Under normal and established operating speeds, the circuit 151 is connected to the pumping well drilled in the seabed. As such, the pumping fluid circulates in the latter.

The valve 103 is closed in order to prevent this fluid from circulating in the main bypass circuit 152. The valve 104 is maintained in open position but it can be actuated on demand in order to overcome the failure of the valve 103.

These two valves 103 and 104 are called the "Main Bypass Valves" or MBPV.

When the pump 110 is operating, the valve 103 is then closed, and is "subjected to" the pressure differential $\Delta P$ generated by the pump 110 and/or imposed by the system.

In case of stoppage of the pump 110, it may be necessary to quickly open the valve 103 in order to balance the upstream and downstream pressures of the pumping device 100 shown in FIG. 1. As such, if the valve 103 and the valve 104 are fully open, they make it possible to balance the pressures then to provide free production (production in "Free Flow" mode) through the main bypass circuit 152. The circuit 161 is connected to the production line to the surface (direction 120).

In such a situation of stoppage of the pump, the valve 103 opens under a substantial pressure differential $\Delta P$, and during its opening, multiphase fluids transit through this valve 103: gases, sands, hydrocarbons, etc. This valve is therefore substantially solicited from a mechanical standpoint during the opening phases.

In the event of a failure of a mechanical element of this valve 103, it is not possible to simply raise it to the surface in order to repair it because its positioning in the pumping station 100 does not allow for this (this is said to be a "non-retrievable" valve). Indeed, although the pumping block can be detached relatively simply, the other parts of the pumping station are installed to practically remain permanently and the maintenance of the latter most often requires the use of RUVs (remotely operated underwater vehicles) or AUVs (autonomous underwater vehicles).

As such, it can be useful to provide a valve 104 in the hypothesis where the valve 103 were to malfunction (e.g. breakage of a mechanical part breaking the seal on the valve 103). The life expectancy of such a combination (elements 103 and 104) can as such be doubled.

In addition, under normal and established operating speeds, the valves 105, 106, 108, 109, 119, 118 are open enabling as such the pumped fluid to flow into the mixer tank 107.

This mixed pumping fluid then passes through the pump 110 thanks to the circuit 156. This pump 110 can be for example a pump of the twin screw MPP type or a pump of the helicoaxial MPP type.

At the outlet of the pump 110, a non-return valve 111 is positioned on the circuit 156 in order to prevent, in case of stoppage of the pump, the excess pressure at the outlet of the pump 110 from causing a backflow in the pump and damaging it.

In addition, in parallel of the circuit 156, a bypass circuit 157 is used to enable a bypassing of the pump 110 by the operating fluid at the moment of the starting, when the pressure in the line 156 is greater than the pressure in the line 158. In the case of starting of the pump 110, it is indeed useful to prevent allowing the so-called free flow production of the well to flow through the pump 110.

This bypass can be called "integrated bypass as this bypass is integrated into the pumping block 101 and can be removed with the latter.

This circuit 160 is then provided with a choke valve 117, and a quick opening valve 116. In the event of a failure of the pump 110, it may be useful to quickly open the valves 116 and 117 in order to balance the upstream and downstream pressures of the pumping block 101. This opening can make it possible to avoid opening the valve 103 (case described hereinabove) and as such limit its wear and tear. The wear and tear is then supported by the parts of the valve 116 and 117 that are simpler to repair since they can be retrieved (with the pumping block 101) in order to be repaired on the surface.

It is therefore customary to open the valve 103 controlling the flow in the main bypass 152 in order to allow the free flow to flow, then to gently start the pump: the latter can then operate temporarily with an excessive flow rate due to the low resistance offered by the fluid. The valve 103 is then closed by an operator by controlling the operating parameters of the pump until the complete closing of the valve 103.

This method can be complex and the use of an integrated bypass 157 as shown in FIG. 1 can simplify it.

The starting of the pump 110 can be carried out with the valve 103 closed. On the other hand, the valve 112 is open.

The free flow of the well then passes, in a first step, through the integrated bypass circuit 157. During the starting of the pump in this configuration, the pump 110 will progressively increase the pressure differential between its inlet and its outlet. Then, the non-return valve 113 on the circuit 157 closes naturally. If the valve 113 closes, the pump works in resistance on the production fluid and cannot function with an excessive flow rate.

The starting is then automatic for the operator and the valve 103 is not mechanically solicited for the starting of the pump.

The production fluid is then injected into the multiphase flow meter 114 in order to control the various parameters at the pump outlet.

This production fluid is then injected into a splitter tank 115. A circuit 159 is then tapped in this tank 115 in such a way as to recover the fluid that is of interest for production (i.e. the crude oil in the framework of an oil well).

Likewise, another circuit 160 (i.e. "recycle line") is tapped in this tank 115 in such a way as to recover a liquid (that is not necessarily of interest for production). The circuit 160 enables a reinjecting of liquid into the mixer tank 107. Indeed, this can be useful in order to prevent, in case of the presence of a substantial volume of gas (i.e. clogs of gas) in the production circuits, starting the pump 110 with an excessively low flow rate and deteriorating it. It is therefore useful to circulate in the pump a minimum flow rate in order to protect the pump 110.

To do this, it is possible to open if necessary a valve located on the recycle line 160 in order to control the flow of liquid to an area upstream of the pump 110 (here, to the mixer tank) and to re-use the liquid in order to avoid operating the pump 110 empty or to operate one of its pumping stages under operating speeds that can deteriorate it.

However, these valves are often valves of the actuated hydraulic valve type. These types of valves have opening and closing times of several minutes and do not make it possible to satisfy the constraints of rapidity linked to the appearance of strong gas bubbles in the production lines.

In order to overcome this problem, it is possible to replace the actuated hydraulic valve mentioned previously with a set of valves in series comprised of:
- an actuated hydraulic valve 117 and
  - a valve 116 of the "on/off" type of which the opening is controlled by the de-energizing of a spring. As such, the opening is immediate, but it is not possible to choose the ratio of closing of the valve: either it is fully open, or it is fully closed.

Thanks to this set, it is possible to control the valve 117 in order to constantly obtain a pre-opening that corresponds to the minimum flow rate for the protection of the pump.

As such, in the case of the presence of a substantial volume of gas (i.e. bubbles of gas) in the production circuits, the valve 116 can be opened very rapidly and place the valve 117 on line set to its pre-opening. Of course, the pre-opening of the valve 117 can vary over time according to the various operating parameters of the pump such as the power consumed or the speed of the pump.

The pump is then protected in a very short period of time.

FIG. 2 shows an example of operating diagrams of a rotodynamic multiphase pump in an embodiment according to the invention.

The first operating curve GVF70 shows the operation of a stage of this pump for a "GVF" of 70%. The GVF (or "Gas Volume Fraction") represents the gas volume fraction with respect to the total volume.

If the pump is operating in an established manner with a "GVF" of 70%, the point of operation of this stage for ideal operation of the pump can correspond to the point 201.

Note that the point of operation of this stage for an ideal operation of the pump does not necessarily correspond to the ideal point of operation for this stage alone. Indeed, as the pump comprises a large number of stages, these two points can be separate in light of the operation of the other stages.

As such, the pumped volume is TF1 m3/h.

The minimum flow rate curve for this pump stage and for a GVF of 70% can be materialised by curve segment 211: a point of operation of this stage located to the left of this segment 211 corresponds to a low speed of the stage, a speed that can deteriorate the latter.

During an abrupt change in the composition of the pumped fluid (e.g. clog of gas), the GVF of the fluid can vary by changing for example to 90%.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A multiphase pumping block device comprising:
   a pump suitable for pumping a pumping fluid;
   a recycle circuit;
   a splitter tank;
   and a multiphase flow meter is located downstream of the pump to take measurements on the pumping fluid at a pump outlet;
   wherein, the splitter tank is connected to an area downstream of the pump and is suitable for separating a liquid phase and a gaseous phase using said pumping fluid;
   wherein the recycle circuit is connected to the splitter tank and is suitable for enabling the flow of the liquid phase from said splitter tank to an area upstream of the pump,
   wherein the recycle circuit comprises at least in series:
      a controllable opening valve, and
      a quick opening valve;
   wherein the quick opening valve authorises on order the flow or not of the liquid phase in the recycle circuit;

wherein, the controllable opening valve is suitable for being pre-opened in order to authorize the partial flow of the liquid phase in the recycle circuit, wherein the quick opening valve is configured to open in the event of a failure of the pump;

and wherein the flow of the liquid phase from said splitter tank to an area upstream of the pump is controlled according to at least one measurement of the fluid by said multiphase flow meter.

2. The device according to claim 1, wherein the device furthermore comprises a mixer tank located upstream of the pump, wherein the flow of the liquid phase through the recycle circuit is carried out towards said mixer device.

3. The device according to claim 1, wherein the at least one measurement of the fluid by said multiphase flow meter is a measurement from among a flow volume measurement, and a measurement of the ratio of the gas volume over total volume.

4. The device according to claim 1, wherein said multiphase flow meter is located upstream of the splitter tank.

5. The device according to claim 3, wherein said multiphase flow meter is located upstream of the splitter tank.

\* \* \* \* \*